No. 704,706.   J. R. McCORD, Jr.   Patented July 15, 1902.
BALANCE BOOK.
(Application filed Jan. 17, 1902.)

(No Model.)

Witnesses:
G. A. Pennington
Gales Prime

Inventor:
James Rhey McCord, Jr.
by Baker & Cornwall
Attys.

UNITED STATES PATENT OFFICE.

JAMES RHEY McCORD, JR., OF ST. LOUIS, MISSOURI.

BALANCE-BOOK.

SPECIFICATION forming part of Letters Patent No. 704,706, dated July 15, 1902.

Application filed January 17, 1902. Serial No. 90,121. (No model.)

*To all whom it may concern:*

Be it known that I, JAMES RHEY MCCORD, Jr., a citizen of the United States, residing at the city of St. Louis, State of Missouri, have invented a certain new and useful Improvement in Balance-Books, of which the following is a full, clear, and exact description, such as will enable others skilled in the art to which it appertains to make and use the same, reference being had to the accompanying drawing, forming part of this specification, in which the single figure represents a page embodying my present invention.

My invention relates to balance-books, and more particularly to the pages thereof, my object being to provide a novel page for books of this character by the use of which the size of the balance-book is materially reduced, the liability of error in crediting or reading balances is reduced to the minimum and the balances of an individual depositor are so presented that they can be easily added for the purpose of computing interest and the like and the balances covering a considerable period of time are visible simultaneously.

A further object is to provide a leaf of such character that but a single depositor's balances are entered thereon, so that the leaves can be bound as a loose-leaf book and only those leaves devoted to open accounts need be kept in the binding.

To these ends and also to improve generally upon devices of the character indicated my invention consists in the various matters hereinafter described and claimed.

Heretofore it has been customary for banks, trust companies, and similar institutions which allow interest upon daily balances to employ a balance-book having pages provided with a series of horizontal lines, there being a vertical name-column at the left of the page and a horizontal series of vertical daily-balance columns, usually fifteen to each page. The names of, say, thirty depositors have been written one below the other in the name-column and the daily balances of each depositor have been written in a horizontal line across the page. This has made it necessary to employ a relatively large leaf to follow a particular horizontal line across a page in order to enter or read a given depositor's balance for any day (thus rendering it easy to enter or read a balance in the wrong line) and to copy each depositor's daily balances at the end of each month or other interest-crediting period in a vertical row in order to add the said balances and compute the interest.

My invention is designed particularly as an improvement upon the above-described page, which has been and is in almost universal use.

Referring now more particularly to the drawing, the sheet is represented as of the well-known loose-leaf type and has a relatively deep space 1 at the top and extending across the entire page, said space having therein appropriately-designated horizontal lines 2 and 3 for the inscription, respectively, of the year and the name of the particular depositor to whose balances the leaf is devoted, and preferably also having therein the words "Daily balances" as a heading for the page. Said space is separated from the remainder of the page by appropriate horizontal ruling 4, and below said ruling is a horizontal space 5, which I shall designate as the "heading-space," suitable ruling 6 separating this space from the portion of the page below the same.

Below the space 5 are a series of horizontal lines 7, preferably thirty-one in number, which produce daily-entry spaces between them, and below said series of lines and separated from each other by appropriate rulings 8 and 9 are "total" and "interest" spaces 10 and 11, respectively, the total-space being next below the said series of horizontal lines and there being preferably a horizontal line 12, forming the bottom of the interest-spaces. Extending horizontally across the page in proximity to each other are a series of vertical daily-balance columns 13, preferably six in number, and upon the outer side of the outer daily-balance columns and between each of said daily-balance columns and its neighboring daily-balance column is a vertical index-column 14. Each of the daily-balance columns is preferably appropriately ruled for the entry of figures representing sums of money.

In the heading-space 5 the names of months are printed or written above the respective daily-balance columns and the word "Day"

is printed or written above the index-column at the left of the page, said word being repeated at the heads of the other index-columns, if it be so desired. The numerals indicating the days of the month are printed or written in the thirty-one spaces in each of the index-columns, and in the total and interest spaces in the line of the left index-column are printed or written the word and abbreviation "Total" and "Int.," respectively. I have illustrated only one page of a sheet. The other page of such sheet is similar to the page illustrated, except that the year and name lines 2 and 3, with their designations, are preferably omitted and the daily-balance columns upon the first page of a sheet are respectively headed with the names of the first six months of the year, while the said columns of the second page of the sheet are respectively headed with the names of the second six months of the year.

In using my sheet the year and the name of the depositor are inscribed upon the appropriate lines, and the balance of such depositor at the close of each day's business is entered in the appropriate space in the proper daily-balance column. Thus there is practically no possibility of making or reading an entry to the credit of a wrong depositor, and at the end of the month all of the daily balances of a particular depositor appear arranged in a vertical column, whereby they can be at once added, copying of the several entries being entirely avoided. The total of the daily balances and the interest computed therefrom are then respectively entered in their appropriate spaces, such spaces being under the heading of the month to which said total and interest refer, and the interest is noted in such a place that it can be conveniently referred to by the bookkeeper for the purpose of adding such amount to the actual daily balance in order to credit the proper daily balance for the first day of the new month.

Manifestly the number of daily-balance columns upon a page can be varied at will, and these columns can be of appropriate lengths to be employed for interest periods other than months. Also but one index-column can be employed, if so desired. Furthermore, it is the custom among some banking institutions to credit the interest on some day other than the 1st of the month—say, for example, on the 25th of the month—the interest period thus running from the 25th of one month to the 25th of the next succeeding month. When the present page is employed for keeping accounts in this manner, the first space of an index-column is numbered to correspond to the day of the preceding month upon which the interest is credited instead of with the 1st of the month noted in the heading-space of the daily-balance column, the numerals in the index-column in such event running from, say, "25" to "24" instead of from "1" to "31." All of such changes I consider to be fully included within the scope of my invention. In fact, I am aware that many minor changes can be made in the page herein shown and described without in the least departing from the nature and principle of my invention.

As will be at once apparent, the new page presents many advantages over the page heretofore employed for posting balances. The book composed of sheets provided with the new pages is much smaller than are the old books, and loose leaves can be employed. Each sheet is devoted to the account of a single depositor, and a complete record of such depositor's daily balances and monthly interest statements for an entire year is presented upon a single sheet, such record for a period of six months being presented upon a single page and each depositor's name being written but once each year. The monthly copying of the several daily balances as heretofore practiced in order to bring these balances into a vertical column for adding is entirely avoided, and there is thus completely eliminated the possibility of error in such copying of the daily balances. In short, by the use of my invention the accounts are kept in a much more compact form than that in which they have been kept heretofore, they are presented in a manner much more convenient for reference, the desired results are obtained by an expenditure of considerably less time and labor than has heretofore been necessary, and danger of errors in posting and reading is reduced to the minimum, while danger of error from copying is entirely eliminated. In other words, better results are obtained with smaller books and less labor than has heretofore been possible.

Having thus described my invention, what I claim as new, and desire to secure by Letters Patent, is—

1. A page of the character indicated having a single main line in combination with a plurality of vertical daily-balance columns arranged in proximity to each other, each of said daily-balance columns having a heading indicating a period of time, and each of said columns being provided with a vertical series of appropriately-designated daily-entry spaces; substantially as described.

2. A page of the character indicated having a single name-line in combination with a plurality of vertical daily-balance columns arranged in proximity to each other, each of said daily-balance columns having a heading indicating a period of time, and each of said columns being provided with a vertical series of appropriately-designated daily-entry spaces, each of said columns being also provided with an interest-space; substantially as described.

3. A page of the character indicated having a single name-line in combination with a plurality of vertical daily-balance columns arranged in proximity to each other, each of said daily-balance columns having a heading indicating a period of time, and a vertical index-column in series with said daily-balance columns, a series of horizontal daily-entry spaces extending across said columns and having in said index-column designations for the several days included in the period of time indicated by the headings of the respective daily-balance columns, and horizontal total and interest spaces extending across said daily-balance columns; substantially as described.

In testimony whereof I hereunto affix my signature, in the presence of two witnesses, this 14th day of January, 1902.

JAMES RHEY McCORD, JR.

Witnesses:
GALES P. MOORE,
T. CASEY WITHERSPOON.

It is hereby certified that in Letters Patent No. 704,706, granted July 15, 1902, upon the application of James Rhey McCord, jr., of St. Louis, Missouri, for an improvement in "Balance-Books," errors appear in the printed specification requiring correction, as follows: Page 1, line 84, the word "lines" should read *spaces;* line 85, same page, the words *them and from* should be inserted after the word "from," and on page 2, line 111, the word "main" should read *name;* and that the said Letters Patent should be read with these corrections therein that the same may conform to the record of the case in the Patent Office.

Signed and sealed this 29th day of July, A. D., 1902.

[SEAL.]

E. B. MOORE,
*Acting Commissioner of Patents.*